Patented Oct. 25, 1932

1,884,318

UNITED STATES PATENT OFFICE

HENRY B. SMITH, OF ROCHESTER, NEW YORK, ASSIGNOR TO EASTMAN KODAK COMPANY, OF ROCHESTER, NEW YORK, A CORPORATION OF NEW YORK

CELLULOSE ORGANIC DERIVATIVE COMPOSITION OF MATTER CONTAINING B-ETHOXY ETHYL LACTATE

No Drawing. Application filed August 10, 1931. Serial No. 556,328.

This invention relates to compositions of matter in which cellulose organic derivatives, such as cellulose acetate or cellulose ethers, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

One object of this invention is to produce a composition of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce a composition of matter which is capable of easy and convenient manipulation in the plastic and analogous arts, such as in the manufacture of sheets, films, artificial silk filaments, varnishes, lacquers and the like, and to produce a composition which will not injure, or be injured by, the substances or surfaces with which it is associated during manufacture. Another object of my invention is to produce compositions which can be molded at elevated temperatures and high pressures to produce plastic products having the desirable properties of celluloid. Still another object of my invention is to produce compositions of matter containing cellulose acetate which have a high degree of flexibility, softness, pliability and clarity. Other objects will become apparent to those skilled in the art to which this invention pertains.

While cellulose acetate has been known for decades, it has also been known that to utilize it in various plastic arts it is necessary to mix therewith such plasticizing or conditioning agents as triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, molded compounds and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not sufficiently compatible with cellulose acetate to be used as plasticizers in cellulose acetate compositions.

I have discovered that valuable properties may be induced in and/or contributed to compositions containing organic derivatives of cellulose, such as cellulose acetate, by adding thereto as a plasticizing compound a B-alkoxy ethyl lactate, such as B-ethoxy ethyl lactate. This compound has the formula

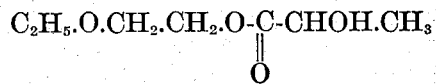

The particularly useful properties which it induces in or contributes to cellulosic compositions containing it are hereinafter enumerated.

B-ethoxy ethyl lactate may be prepared as follows: 1800 g. of ethylene glycol monoethyl ether, 870 g. of lactic acid, and 50 g. of p-toluenesulfonic acid are placed in a 5-liter flask fitted with a long column. The reaction mixture is heated to distill the water formed in the reaction. Some ethylene glycol monoethyl ether goes over also. Sodium carbonate is added from time to time to the ethylene glycol monoethyl ether-water mixture, and the ethylene glycol monoethyl ether which separates is returned occasionally to the reaction mixture. When 250 g. of water has been collected, the reaction mixture is distilled under reduced pressure. The B-ethoxy ethyl lactate distills over at 100–102° C. at 16 mm. pressure.

In order that those skilled in this art may better understand my invention I would state, by way of illustration, that for the manufacture of photographic film or other sheets my new composition of matter may be compounded as follows: 100 parts of acetone-soluble cellulose acetate, i. e. cellulose acetate containing from 36% to 42% acetyl radical, approximately, is dissolved with stirring at atmospheric temperature in 300 to 500 parts, preferably 400 parts, by weight, of acetone. To this solution may be added from 10 to 50 parts by weight of B-ethoxy ethyl lactate, it being found preferable to employ from 20 to 30 parts thereof, approximately. Within the limits stated, the amount of plasticizer may be decreased or increased, depending upon whether it is desired to have a more or less freely flowing composition, respectively.

A composition of matter prepared as above described may be deposited upon any suitable film-forming surface to form a film or sheet, in a manner well known to those skilled in the art. A film so produced has permanently brilliant transparency (even where as much as 50 to 60 parts of B-ethoxy ethyl lactate per 100 parts of cellulose organic derivative, such as cellulose acetate, is used) and low inflammability, burning no more readily than ordinary newsprint. Films or sheets produced in accordance with my invention are quite tough and flexible. For instance, films of cellulose acetate plasticized with 30% to 50% (parts by weight based on the acetate) of B-ethoxy ethyl lactate had an initial flexibility of from 25% to 75% greater than that of film containing no plasticizer. Furthermore, film so plasticized maintains flexibility in a superior fashion. For instance, films containing 20% and 30% of B-ethoxy ethyl lactate maintained flexibility at 65° C. for 135 days and 170 days, respectively, whereas an unplasticized film became brittle in 30 days. This demonstrates that film so plasticized will withstand ordinary usage satisfactorily for many years. The sum total of the above advantageous properties of products produced from my new compositions is considerably in excess of that of products produced with what have previously been regarded as the better plasticizers.

Other similar solvents (instead of acetone) which are compatible with the cellulose acetate and my new plasticizers may also occur to those skilled in this art. In like manner these plasticizers may be compounded with other single organic esters of cellulose, such as cellulose propionate, butyrate and the like, or with mixed organic and/or inorganic esters such as cellulose aceto-stearate, cellulose aceto-propionate, cellulose aceto-malate, or cellulose nitro-acetate, or with cellulose ethers, a suitable solvent which will dissolve both the cellulosic derivative and the plasticizer being employed.

Inasmuch as my above described compositions of matter are quite useful in the production of films and sheets, it will be apparent that my new plasticizers may also be employed with advantage in the other branches of the plastic art. For instance, my above described compositions of matter may be employed in the manufacture of artificial silk by the dry spinning method. With the proper coagulating bath they may also be employed for wet spinning. It may be desired to employ compositions of different viscosity or evaporation characteristics, but this is a mere matter of changing the solvent proportion or adding evaporation retardents or other high or intermediate boiling constituents, as has been well known in the art for more than a decade. My novel plasticizers may also be employed with advantage in connection with a number of the known lacquer and varnish formulæ with which they may be found to be compatible. In such cases the plasticizer is usually first put into solution in the cellulose derivative solution, and if non-solvents are added for the purpose of cheapening the composition they are added only to such an extent as will not precipitate the derivative from solution. Also the plasticizer is usually employed in larger amounts, such as from 50 to 60 parts, in compounding lacquers. Other uses within the scope of my invention will also suggest themselves to those skilled in the art and are to be included within the scope of the claims appended hereto.

B-ethoxy ethyl lactate may also be advantageously used as a plasticizer in cellulose acetate molding compositions. For instance, when from about 20% to 40% (parts by weight based on the cellulose acetate) of B-exthoxy ethyl lactate is homogeneously mixed with cellulose acetate, the mixture may be converted into a hard, translucent plastic product by molding at a temperature of 140° to 160° C. and a pressure of from 2000 to 5000 pounds per square inch for a period of from 2 to 5 minutes, in a manner already known to those skilled in molding compounds of that nature.

Moreover, I have found that, upon the addition to cellulose acetate of approximately 100% of B-ethoxy ethyl lactate, quite unexpected compatibility of the plasticizer with the cellulose acetate exists, and also that quite unexpected flexibility and plasticity of the final product results. Contrary to experience in most cases where such a large proportion of plasticizer is used, no exudation or crystallizing out of the plasticizer occurs. In fact this plasticizer may be used in almost any proportion with cellulose acetate, since it is a solvent for it.

Such compositions have great utility where a highly flexible compound is desired, such as in the coating of a base (for instance, cloth or other fabric) in the production of artificial leather or the production of relatively thin sheets wherein more than the usual flexibility is important. Such a composition, if converted, for instance, into sheet form will be found to be supple and non-rigid, and to have the ability to conform readily to a surface upon which it may be placed, and this even at atmospheric temperatures These novel compositions of matter are produced by merely mixing the plasticizer with cellulose acetate and then adding sufficient of a common solvent, such as acetone, whereupon an intimate mixture of the plasticizer with the cellulose acetate results. The amount of acetone or other common solvent to be employed varies, of course, within rather wide limits depending upon the fluidity of the composition desired. 100 parts of acetone will suffice for many purposes, although we prefer to use 400 parts. Various high boilers or evaporation retardents, such as ethyl lactate, amyl acetate or the like may also be added if desired, as is well known in this art.

The compositions of matter so produced may then be coated into sheets in the usual way by depositing them upon plates or rolls and permitting the solvent to evaporate. If my novel compositions are to be employed in the manufacture of artificial leather, they may be coated upon, for instance, a cloth support and the solvent permitted to evaporate, or the cloth support may be caused to pass through the cellulose acetate-plasticizer composition and permitted to absorb the solution, the solvent in the coating being then permitted to evaporate. In either case, the solvent may, of course, be recovered if desired by condensing the vapors, etc.

While above and in certain of the claims appended hereto, I have referred to the use of a plasticizer in approximately equal proportions, namely in a ratio of approximately 100%, it will be understood that within this terminology variations of from 10% to 15% less than 100% of plasticizer and as much as 25% to 50% more than 100% of the plasticizer may in some instances be desirable.

What I claim as my invention and desire to be secured by Letters Patent of the United States is:

1. A composition of matter comprising an organic derivative of cellulose and a B-ethoxy ethyl lactate.
2. A composition of matter comprising cellulose acetate and B-ethoxy ethyl lactate.
3. A composition of matter comprising 100 parts of cellulose acetate and about 10 to 100 parts, by weight, of B-ethoxy ethyl lactate.
4. A relatively thin sheet comprising 100 parts of cellulose acetate and about 10 to 100 parts, by weight, of B-ethoxy ethyl lactate.
5. A molding composition adapted to molding under elevated temperatures and high pressures, comprising cellulose acetate and B-ethoxy ethyl lactate.
6. A molding composition adapted to molding under elevated temperatures and high pressures, comprising 100 parts of cellulose acetate and approximately 20 to 50 parts, by weight of B-ethoxy ethyl lactate.

Signed at Rochester, New York, this 31st day of July, 1931.

HENRY B. SMITH.